Patented Mar. 6, 1951

2,544,555

UNITED STATES PATENT OFFICE 2,544,555

REACTION OF DIOLEFIN POLYMERS WITH HYDROGEN AND CARBON MONOXIDE

Jean P. Jones and William Nelson Axe, Bartlesville, Okla., assignors to Phillips Petroleum Company, a corporation of Delaware No Drawing. Application May 6, 1948, Serial No. 25,523

12 Claims. (Cl. 260—82)

This invention relates to the preparation of resinous oxygen-containing materials. In one aspect this invention relates to polyolefinic polymeric hydrocarbons and their utilization in the preparation of resinous oxygen-containing compounds. In a more specific aspect this invention relates to the utilization of clay tower polymers for the production of resinous oxygen-containing compounds.

Cracking of unrefined distillates is a common and well known step in petroleum refining. The cracked product of such a step contains polyolefinic compounds which have potential gum-forming and color-forming properties and are detrimental, therefore, to the use of the distillates in finished stocks. A widely used process for the removal of such polyolefinic compounds is a clay treatment process in which a normally liquid, cracked distillate stream having an end point of about 410 to 450° F. is contacted with an absorptive clay, and the aforesaid polyolefin compounds contained therein are selectively polymerized and subsequently removed as polymeric by-products. The polymeric by-products, so produced are utilized in the process of this invention and are commonly referred to as "clay tower polymers"; they are products of homopolymerization of polyolefins and of copolymerization of polyolefins with monoolefins and/or other polyolefins, and in any case are more highly unsaturated than monoolefins. Monoolefins contained in the distillate being treated are polymerized in very minor amounts during the clay treatment.

Although the clay treating process can be conducted in the vapor, liquid or mixed phase, the mixed phase is preferable since such conditions minimize the loss of monoolefins. Temperature conditions of the clay treating process are generally in the range of from 250 to 750° F. and the pressure is from 50 to 600 p. s. i. The total clay tower polymer by-product occurs usually as a normally viscous liquid material; it chiefly comprises polyolefinic polymeric compounds in the molecular weight range of 200 to 800. The normally solid fractions thereof comprise polyolefinic polymers having molecular weights as high as from 500 to 800, although the major proportion of such solid fractions is in the molecular weight range of 300 to 500. The liquid fractions chiefly comprise polymeric materials formed by the homopolymerization of diolefins and by the copolymerization of diolefins and monoolefins. The general properties of clay tower polymers are shown in the following tabulation:

| | Total Clay Tower Polymer | Normally Solid Fractions of Clay Tower Polymer |
|---|---|---|
| Gravity, API @ 60° F. | 10–40 | |
| Nonvolatile Content, per cent [1] | 60–90 | 100 |
| Iodine Number [2] | 190–250 | 190–300 |
| Viscosity @ 100° F., SUS [3] | 200–11,000 | |
| Viscosity @ 200° F., SUS [3] | 40–150 | |
| Flash Point, °F. [4] | 185–325 | |
| Fire Point, ° F. [4] | 205–345 | |
| Pour Point, ° F. [5] | −20–60 | |
| Softening Point [6] | | 140–250 |

[1] Per cent nonvolatiles as measured at 225 F. for a duration of 3 hours.
[2] Wijs-grams iodine that will react with 100 grams of sample.
[3] ASTM designation 446-39.
[4] ASTM designation D92-45.
[5] ASTM designation D-97.
[6] ASTM designation D36-26.

Although a clay treating process as above described, is a preferred source of polyolefinic polymeric hydrocarbons for the accomplishment of the objects of this invention, other sources may be utilized therefor. For example, conjugated polyolefinic hydrocarbons such as butadiene, pentadiene, cyclopentadiene, hexadiene, and the like, may be polymerized by any of various known polymerization methods, to produce polyolefinic polymeric hydrocarbons, suitable in the practice of our invention. Such polyolefinic compounds, as above named, can also be copolymerized with monoolefinic hydrocarbons to form polyolefinic polymeric hydrocarbons advantageously employed in our invention.

An object of this invention is to provide a method for the preparation of resinous oxygen-containing materials.

Another object is to provide a method for the utilization of clay tower polymers to produce resinous oxygen-containing materials.

A further object is to convert normally liquid or solid polymeric hydrocarbons having greater unsaturation than monoolefins to resinous oxygen-containing materials.

Other objects will be apparent, to one skilled in the art, in the light of the accompanying disclosure and discussion.

In accordance with this invention a polymeric hydrocarbon having a greater degree of unsaturation than a monoolefin and having a molecular weight in the range of 200 to 800, is reacted with carbon monoxide and hydrogen in the presence of a suitable Fischer-Tropsch catalyst to form a resinous, solid oxygen-containing product. The reaction is preferably conducted in two steps. In the first step, the polymeric starting material is reacted with hydrogen and carbon monoxide to form a resinous product, and in the second step the resinous product so formed is further reacted with hydrogen in the absence of carbon monoxide, either in the presence of the original catalyst or of a suitable hydrogenating catalyst substituted therefor. The product of the second step is generally a clear, solid oxygen-containing resinous material especially suitable for use as a coating material.

Polymeric hydrocarbons utilized in the process of this invention are clay tower polymers, or any fraction or fractions thereof, and those produced by polymerizing a low-boiling diolefin, as butadiene or its homologues alone, or in the presence of a monoolefinic hydrocarbon such as isobutylene or styrene or homologues of either.

We prefer to conduct our process in two steps as aforesaid. However, depending upon the particular reactants and reaction conditions selected, we may obtain a valuable solid resinous material as a product of the first reaction step. In a large number of instances, however, the preferred resinous material is obtained as a product of the combined first and second reaction steps.

When we utilize liquid polymeric hydrocarbons, we prefer in most instances to employ an inert diluent such as hexane, cyclohexane, heptane, and the like. Such a diluent serves as a medium for the entire reaction and contains the catalyst in a finely divided suspended state. When utilizing normally solid polymeric materials a solvent, such as an inert diluent of the type above described is advantageously employed as a reaction medium even though in most instances, such a solid polymeric material is a liquid at the reaction temperature.

In the practice of a preferred form of our invention, we dissolve the hydrocarbon reactant in an inert diluent, such as normal hexane or cyclohexane, in an amount usually within the limits of 30 to 90 per cent by weight; lower concentrations of the hydrocarbon reactant in the solution may be employed, if desired. A Fischer-Tropsch catalyst, i. e., a material which serves as a catalyst in the hydrogenation of carbon oxides, is suspended in a finely divided state in the solution above described, in an amount in the range of from 1 to 10 per cent by weight. Water gas, i. e., a mixture of hydrogen and carbon monoxide, containing hydrogen in molar ratio to carbon monoxide within the limits of 0.1:1 to 2:1, is added to the solution at a pressure within the range of 50 to 4500 p. s. i.; more preferably in the range of 500–2000 p. s. i. Hydrogen and carbon monoxide reactants may be added to the reaction solution separately, if desired. The reaction is then carried out in a first step in a temperature range of from 100 to 400° F., and a contact time of at least 10 minutes; more often the time is at least in the range of from 30 to 90 minutes and may be as high as 10 hours. The product from the first step, is usually a mixture of saturated and unsaturated resinous oxygen containing materials having utility as drying oils and coatings. However, we prefer usually to further react the above mentioned product with hydrogen in a second step. This is done, subsequent to removal of carbon monoxide from the system and replacement of same with hydrogen. We may do this by releasing the pressure in the system, purging the system preferably with hydrogen, and then adding hydrogen thereto at about the same pressure employed in the first reaction step. The second step is then carried out under about the same conditions of temperature, pressure, catalyst, and contact time as those of the first step, although, in some cases, it is desirable to use somewhat higher pressures. No other change in reaction conditions need be effected to make the hydrogenation substantially complete. The chief product of the second reaction step is a celar, solid oxygen-containing resinous material and is especially suitable as a coating material and as an ingredient for varnishes, lacquers, and the like.

In the second step it may be, in some instances, desirable to substitute a different hydrogenation catalyst for the original catalyst. This is especially advantageous from an economical standpoint in cases where the cost of the original catalyst is relatively high as compared to that of the hydrogenation catalyst. Another advantage to be gained thereby is in the treatment of sulfur-containing stocks wherein a hydrogenation catalyst uninhibited by the presence of sulfur would be required.

Our process offers especial utility in its application to clay tower polymers as a starting material. The characteristics of clay tower polymers have long been known and the polymers long been considered to be of no special value. In many cases, clay tower polymers as a by-product of the clay-treating process have presented difficult disposal problems. By the application of our process, by-product clay tower polymers are converted to valuable resinous oxygen-containing compounds.

Our process has further utility as regards its application to clay tower polymers, in view of their constantly changing composition which is dependent upon the specific hydrocarbon feed being processed and the conditions necessary to effect the required clay treatment. Our process offers a high degree of utilization of such by-product polymers throughout their entire range of composition.

Our preferred Fischer-Tropsch catalyst is a cobalt-thoria catalyst supported on kieselguhr and contains the three components in a respective weight ratio of about 100:18:100. Other ratios may be employed if desired. However, the use of other Fischer-Tropsch catalysts such as iron and/or nickel, is applicable to our process. All such catalysts may be supplemented when desired, with one or more promoters or modifiers such as, oxides of alkali and alkaline earth metals.

We prefer to apply our process to sulfur-free stocks. In many instances this would be achieved by desulfurization of our feed stocks. As regards the utilization of sulfur-containing clay tower polymers, sulfur-free stocks would be most easily procured by desulfurization of the cracked hydrocarbon fraction to be clay-treated by desulfurizing the charge to the initial cracking step, or by the clay treatment of stocks initially sulfur-free. However, we can utilize sulfur-containing feed stock in the first step of our process, if desired, when we employ a cobalt catalyst such as the one above described. In the second step, we may substitute for the cobalt catalyst a hydrogenation catalyst having an activity unimpaired by the presence of sulfur-containing materials. Such a well-known catalyst is molybdenum sulfide.

Advantages of this invention are illustrated by the following examples. The reactants and their proportions and other specific ingredients are presented as being typical and should not be construed to limit the invention unduly.

*Example I*

To a reaction bomb is added a viscous liquid clay tower polymer having a solids content of 85 per cent an API gravity of 15.7°, a flash point of 220° F., a viscosity of 210° F. of 37 SUS, a pour point of —5° F., and an iodine number of 224. The polymeric charge material is dissolved in cyclohexane in a weight ratio thereto of 1:2, and 5 per cent of a finely divided Fischer-Tropsch catalyst comprising cobalt, thoria, and kieselguhr in a respective weight ratio of 100:18:100 is suspended in the solution. An equimolar mixture of hydrogen and carbon monoxide is added to the reaction bomb at a pressure of 500 p. s. i. The contents of the bomb are agitated while bringing it to a temperature level of 300° F. which is maintained thereafter for 30 minutes. The reaction mixture is then cooled and the gases released. The system is then purged with hydrogen to remove the last traces of carbon monoxide, after which hydrogen is added at a pressure of about 500 p. s. i. and the bomb contents agitated and heated as above described for another 30 minute reaction period. After the bomb is cooled, the resulting reaction products are recovered. The chief product comprises a clear, normally solid resinous, oxygen-containing material having properties especially suiting it for use in paints and lacquers.

*Example II*

A normally solid fraction of a clay tower polymer having a solids content of 100 per cent as measured at 225° F. for a period of 3 hours, an iodine number of 220, and a softening point of 178° F. is dissolved in normal hexane in a weight ratio thereto of 1:2, and 8 per cent of a finely divided Fischer-Tropsch catalyst comprising cobalt and thoria on kieselguhr in a respective weight ratio of 100:18:100 is suspended in the solution. An equimolar mixture of hydrogen and carbon monoxide is added to the reaction system at a pressure of 1000 p. s. i. The reaction mixture is agitated and heated to a temperature of 400° F. The reaction conditions are maintained for 20 minutes and the reaction mixture subsequently cooled. The gases are released from the cooled mixture and the system subsequently purged with hydrogen to remove the last traces of the carbon monoxide. The cobalt catalyst is removed from the reaction system and is replaced with a hydrogenation catalyst comprising molybdenum disulfide. The system is purged with hydrogen after which hydrogen is added at a pressure of about 1000 p. s. i. and the reaction mixture agitated and again heated for a period as aforedescribed. After the bomb is cooled, the resulting reaction products are recovered. The chief product comprises a clear, normally solid resinous oxygen-containing material which is quite stable and is especially suited for use as a coating and as an ingredient in paints and lacquers.

*Example III*

Butadiene was polymerized and the polymer product reacted with carbon monoxide and hydrogen to produce a clear, dark, solid, resinous, oxygen-containing material.

The polymer was prepared in the presence of benzene as a solvent for the reaction and sodium as a catalyst therefor. In conducting the polymerization, 4.0 lbs. benzene was charged to a stirred stainless steel reactor along with 0.016 lb. sodium, as a 20 per cent dispersion in xylene. About 1.60 lbs. of butadiene was then gradually added to the reactor contents at a constantly maintained pressure of 30 p. s. i. g. and at a temperature of about 158° F. The reaction time was about 5 hours. Solid catalyst and minor amounts of solid polymer were removed from the total reaction mixture by filtration. The liquid effluent was water washed and debenzenized and dexylenized at a temperature of 212° F. under reduced pressure. The resulting polymeric product was a reddish, viscous hydrocarbon material having a molecular weight in the range of from 400 to 2000, and was pentane soluble. Polybutadiene produced in this manner has a viscosity within the range of 40 to 50 SAE, which range is within the broader range of 200 to 11,000 SUS as measured at 100° F., disclosed hereinabove in defining the clay tower polymer reactant materials, of our process.

About 84 grams of the pentane-soluble material was diluted with 100 ml. of n-heptane and charged to a 300 ml. reactor. About 6.5 grams of cobalt-thoria-kieselguhr catalyst (100:18:100), previously reduced with hydrogen for 24 hours at a temperature of 752° F., was added to the 300 ml. reactor. The reactor was then charged with an equimolar mixture of carbon monoxide and hydrogen to a pressure of 2000 p. s. i. Agitation of the reaction mixture was maintained during the entire initial heating period. The pressure slowly increased with increased temperature until reaction occurred as indicated by a decrease in reaction pressure. The temperature was thereafter maintained at a substantially constant level, and additional gas mixture was charged to maintain the pressure level at 2000 p. s. i. After a 5 hour reaction period at a temperature of 350° F. and a pressure of 2000 p. s. i. g., heating was discontinued and the reactants were permitted to cool. The reaction system was depressured and a sticky, black, fluffy solid was recovered. All the n-heptane was dissolved or occluded in the solid catalyst and product mixture. The total solid product was removed and the reactor was conditioned for a subsequent step, hereinafter described. About one-half of the total solid product of the carbon monoxide-hydrogen reaction was subjected to extraction with boiling benzene. About 30 per cent of the total product was benzene soluble and the remaining 70 per cent was found to be inorganic. Resinous extract material, comprising the product of the reaction was clear brown in color, and rapidly hardened upon standing in air. After two days standing the material became virtually insoluble in benzene. Benzene solutions of these resins, when applied on glass, formed a hard, dry film immediately upon evaporation of the solvent. In a subsequent reaction step the remaining portion of the total solid product of the carbon monoxide-hydrogen reaction was admixed with more n-heptane and the admixture, together with 6.3 grams of a copper chromite catalyst, was charged to a reactor.

The copper chromite catalyst was prepared by reacting trihydrated copper nitrate ammonium dichromate in the presence of minor amounts of barium nitrate and ammonia. A precipitate thus formed was filtered, washed and dried. The dried precipitate, orange colored, was pulverized and then slowly decomposed over a flame. During the decomposition the color of the precipitate gradually changed from orange to brown and finally to black. The black decomposition product was cooled and bleached with dilute acetic acid (about 10 per cent), filtered washed, dried and pulverized. The catalyst thus prepared comprises the copper chromite catalyst referred to herein.

Hydrogen was charged to the n-heptane-resin-catalyst mixture to a pressure of 2000 p. s. i. Heat was applied and initial reaction was observed at a temperature of 390° F. Slight pressure decreases occurred over a 4 hour period while maintaining a temperature level of 390° F. After the 4 hour period, heating was terminated and the reactants cooled. The total hydrogenated product was subjected to benzene extraction in a manner identical to that described above for product of the carbon monoxide-hydrogen reaction. The total solid product contained 46 per cent by weight of benzene soluble resin, which was tacky and dark brown in color and which did not harden in the presence of air over a 24 hour period at room temperature.

As will be evident to those skilled in the art, various modifications can be made or followed, in the light of the foregoing disclosure and discussion, without departing from the spirit or scope of the disclosure or from the scope of the claims.

We claim:

1. A process for the preparation of a resinous oxygen-containing material from a polymer of a conjugated diolefin containing from 4 to 6 carbon atoms in the molecule, having a viscosity within the limits of 200 and 11,000 SUS as measured at 100° F. and having a molecular weight within the limits of 200 and 2,000, comprising reacting such a polymer with hydrogen and carbon monoxide in the presence of a catalyst active in the hydrogenation of carbon monoxide with hydrogen for a contact time of at least 10 minutes, at a temperature within the limits of 100 and 400° F., and at a pressure within the limits of 50 and 4500 p. s. i., and recovering a resinous oxygen-containing material from the reaction mixture as a product of the process.

2. A process for preparing a resinous oxygen-containing material from a polymer of a conjugated diolefin containing from 4 to 6 carbon atoms in the molecule, having a viscosity within the limits of 200 and 11,000 SUS as measured at 100° F. and having a molecular weight within the range of 200 to 800, comprising reacting in a first step such a polymer with hydrogen and carbon monoxide in the presence of a cobalt-containing catalyst active in the hydrogenation of carbon monoxide with hydrogen for a contact time of at least 10 minutes at a temperature in the range of 100 to 400° F., at a pressure within the limits of 50 and 4500 p. s. i.; in a second reaction step removing carbon monoxide and said catalyst from the reaction system above described, replacing the carbon monoxide so removed with hydrogen, replacing said catalyst with a hydrogenation catalyst selected from the group consisting of copper chromite, molybdenum sulfide and molybdenum oxide, maintaining the aforesaid conditions of temperature, pressure and contact time, and recovering from the reaction mixture of said second step a resinous oxygen-containing product.

3. A process for the preparation of a solid oxygen-containing resinous material from a polybutadiene having a molecular weight in the range of 400 to 2000 and a viscosity within the limits of 40 and 50 SAE: reacting said polybutadiene with water gas at a temperature in the range of 100 to 400° F., and at a pressure in the range of 50 to 4500 p. s. i. for a contact time of at least 10 minutes in the presence of a cobalt-thoria catalyst supported on kieselguhr; said water gas containing hydrogen to carbon monoxide in a mol ratio within the limits of 0.1:1 to 2:1, and recovering from the reaction mixture a glassy, resinous oxygen-containing solid.

4. A process for the preparation of an oxygen-containing resinous material from a polybutadiene having a molecular weight in the range of 400 to 2000 and a viscosity in the range of 40 and 50 SAE, in a first step reacting said polybutadiene with water gas in the presence of a cobalt-containing catalyst active in the hydrogenation of carbon monoxide with hydrogen, at a temperature in the range of 100 to 400° F. and at a pressure in the range of 50 to 4500 p. s. i. for a contact time of at least 10 minutes; said water gas containing hydrogen in a mol ratio to carbon monoxide within the limits of 0.1:1 to 2.0:1; in a second reaction step removing carbon monoxide from the reaction mixture above described and replacing same with hydrogen, maintaining aforesaid conditions of temperature, pressure, contact time, and catalyst, and recovering from the reaction mixture of said second step a tacky resinous material.

5. A process for preparing a resinous oxygen-containing material from a polymer of a conjugated diolefin containing from 4 to 6 carbon atoms in the molecule and having a viscosity within the limits of 200 to 11,000 SUS as measured at 100° F., comprising reacting in a first step such a polymer having a molecular weight within the limits of 200 to 800, dissolved in an inert diluent in a proportion therein in the range of 30 to 90 weight per cent, with hydrogen and carbon monoxide in the presence of a cobalt catalyst containing a metal oxide activator and active in the hydrogenation of carbon monoxide with hydrogen, for a duration of at least 10 minutes, at a temperature on the range of 100–400° F., and at a pressure within the limits of 50 to 4500 p. s. i.; in a second step removing carbon monoxide from the reaction mixture above described and replacing same with hydrogen, maintaining aforesaid conditions of temperature, pressure, duration, and catalyst, and recovering from the reaction mixture of said second step a resinous oxygen-containing material.

6. The process of claim 1 wherein the polymer starting material comprises a product of the copolymerization of a monoolefinic hydrocarbon and a diolefin.

7. A process for the production of a resinous oxygen-containing material from a normally solid polymer by-product of a mixed phase clay treatment of unrefined cracked distillate conducted in the presence of a contact mass comprising a clay, at a temperature in the range of 250 to 750° F. and at a pressure in the range of 50 to 600 p. s. i.; said polymer by-product consisting of 100 per cent nonvolatile material as measured for a duration of 3 hours at a temperature of 225° F., having an iodine number in the range of 190 to 300, and a softening point within the limits of 140° to 200° F.; said process comprising dissolving said normally solid fraction in an inert diluent to comprise from 30 to 90 per cent by weight of the solution, reacting in a first step said dissolved fraction with water gas in the presence of a cobalt-containing catalyst active in the hydrogenation of carbon monoxide with hydrogen suspended in said solution in a proportion therein of from 1 to 10 per cent by weight, at a temperature in the range of 100 to 400° F., a pressure in the range of 50 to 4000 p. s. i., and for a contact time of at least 10 minutes; said water gas containing hydrogen in a mol ratio to carbon monoxide in the range of 0.1 to 2.0; in a second step removing carbon monoxide from the reaction mixture above described and replacing same with hydrogen, maintaining aforesaid conditions of duration, temperature, pressure, and catalyst, and recovering from the reaction mixture of said second step a resinous oxygen-containing material.

8. A process for the production of a resinous oxygen-containing material from the total polymer by-product of a mixed phase clay treatment of unrefined cracked gasoline conducted in the presence of a contact mass comprising a clay at a temperature in the range of 250 to 750° F., and a pressure in the range of 50 to 600 p. s. i.; said total polymer having an API gravity in the range of 10 to 40°, a nonvolatiles content in the range of 60 to 90 per cent by weight, an iodine number in the range of 190 to 250, a viscosity at 200° F. in the range of 40 to 150 SUS, a flash point in the range of 185 to 325° F. a fire point in the range of 205 to 345° F., and a pour point in the range of −20 to 60° F., said process comprising in a first step dissolving said total product in an inert diluent to comprise from 30 to 90 per cent by weight of the solution, reacting said dissolved product with water gas in the presence of a catalyst containing cobalt and active in the hydrogenation of carbon monoxide with hydrogen, suspended in said solution in a proportion therein from 1 to 10 per cent by weight, at a temperature in the range of 100 to 400° F., a pressure in the range of 50 to 4500 p. s. i., and for a duration of at least 10 minutes; said water gas containing hydrogen in a mol ratio to carbon monoxide in the range of 0.1 to 2.0; in a second step removing carbon monoxide from the reaction mixture above described and replacing same with hydrogen, maintaining aforesaid conditions of duration, temperature, pressure, and catalyst, and recovering from the reaction mixture of said second step a resinous oxygen-containing material.

9. The process of claim 1 wherein said catalyst is an iron-containing catalyst.

10. The process of claim 1 wherein said catalyst is a nickel-containing catalyst.

11. A process for preparing a resinous oxygen-containing material from a polybutadiene having a molecular weight in the range of 400 to 2000 and a viscosity in the range of 40 to 50 SAE, in a first step reacting said polybutadiene with hydrogen and carbon monoxide in the presence of a catalyst active in the hydrogenation of carbon monoxide with hydrogen, for a contact time of at least ten minutes, at a temperature in the range of 100 to 400° F. and at a pressure within the limitation of 50 to 4500 p. s. i. g.; in a second reaction step removing carbon monoxide and the catalyst of said first step from the reaction mixture, replacing said carbon monoxide with hydrogen and replacing the catalyst thus removed with copper chromite as a hydrogenation catalyst, maintaining the aforesaid conditions of contact time, temperature, and pressure, and recovering from the reaction mixture of said second step a resinous oxygen-containing material.

12. A method for preparing a resinous oxygen-containing material from a polymer of a conjugated diolefin containing from 4 to 6 carbon atoms in the molecule and having a viscosity within the limits of 200 to 11,000 SUS as measured at 100° F. having a molecular weight in the range of 200–2000, comprising reacting such a polymer with hydrogen and carbon monoxide for a contact time of at least 10 minutes, at a temperature in the range of 100–400° F. and a pressure within the limits of 50 to 4500 p. s. i. g., in the presence of a catalyst active in the hydrogenation of carbon monoxide with hydrogen and containing cobalt, thoria, and kieselguhr, in a respective weight ratio of 100:18:100; and recovering from the total reaction mixture a resinous oxygen-containing material.

JEAN P. JONES.
WILLIAM NELSON AXE.

REFERENCES CITED

The following references are of record in the file of this patent:

UNITED STATES PATENTS

| Number | Name | Date |
|---|---|---|
| 1,704,194 | Hultman | Mar. 5, 1929 |
| 1,914,727 | Pier | June 20, 1933 |
| 2,462,448 | Whitman | Feb. 22, 1949 |

FOREIGN PATENTS

| Number | Country | Date |
|---|---|---|
| 257,256 | Great Britain | Jan. 10, 1928 |

OTHER REFERENCES

Wender et al., Bureau of Mines RI. 4270, June 1948, 26 pages, especially pages 8 and 9.

Certificate of Correction

Patent No. 2,544,555　　　　　　　　　　　　　　　　　　　　　March 6, 1951

JEAN P. JONES ET AL.

It is hereby certified that error appears in the printed specification of the above numbered patent requiring correction as follows:

Column 4, line 17, for "celar" read *clear*; column 6, line 74, after the word "nitrate" insert *with*; column 8, line 49, for "on the" read *in the*; column 10, line 57, under the heading "OTHER REFERENCES", add *Pichler, Brennstoffe-Chemie, 19, No. 12, pages 226-230 (1938)*.

and that the said Letters Patent should be read as corrected above, so that the same may conform to the record of the case in the Patent Office.

Signed and sealed this 10th day of July, A. D. 1951.

[SEAL]

ERNEST F. KLINGE,
*Assistant Commissioner of Patents.*